United States Patent [19]

Hernandez et al.

[11] 4,308,558
[45] Dec. 29, 1981

[54] PAGE SELECTION DEVICE FOR VIDEOTEXT SYSTEM

[75] Inventors: Charles Hernandez, Villejuif; Jean-François Marquet, Clamart, both of France

[73] Assignee: Telediffusion de France, Paris, France

[21] Appl. No.: 152,499

[22] Filed: May 22, 1980

[30] Foreign Application Priority Data

May 23, 1979 [FR] France ............................ 79 13239

[51] Int. Cl.³ ............................................. H04N 7/08
[52] U.S. Cl. .................................. 358/142; 358/146; 358/147
[58] Field of Search ..................... 358/142, 147, 146

[56] References Cited

U.S. PATENT DOCUMENTS 3,927,250 12/1975 Rainger .............................. 358/146
4,233,628 11/1980 Ciciora ............................... 358/147

Primary Examiner—Robert L. Richardson
Attorney, Agent, or Firm—Holman & Stern

[57] ABSTRACT

A page selection device for a videotext system in which the incoming data are arranged in blocks comprising a data group following a prefix, some of the blocks having within said group specific codes called page headers, a page comprising the data between a page header and an end of page code, the page to be displayed being transferred to a page memory, said device comprising an input buffer having a capacity of at least one block, in which data are entered as they appear, an additional buffer with a capacity of at least one block, in which the incoming data are only entered if a page header has been detected, a main buffer with a capacity of at least one page, in which the content of the input buffer is transferred when a page header is detected, and means for comparing the page number entered in the additional buffer with the selected number and for controlling, according to whether the comparison is positive or not, either reading of the data entered in the main buffer for transfer to said memory or resetting to zero the additional and main buffers.

1 Claim, 1 Drawing Figure

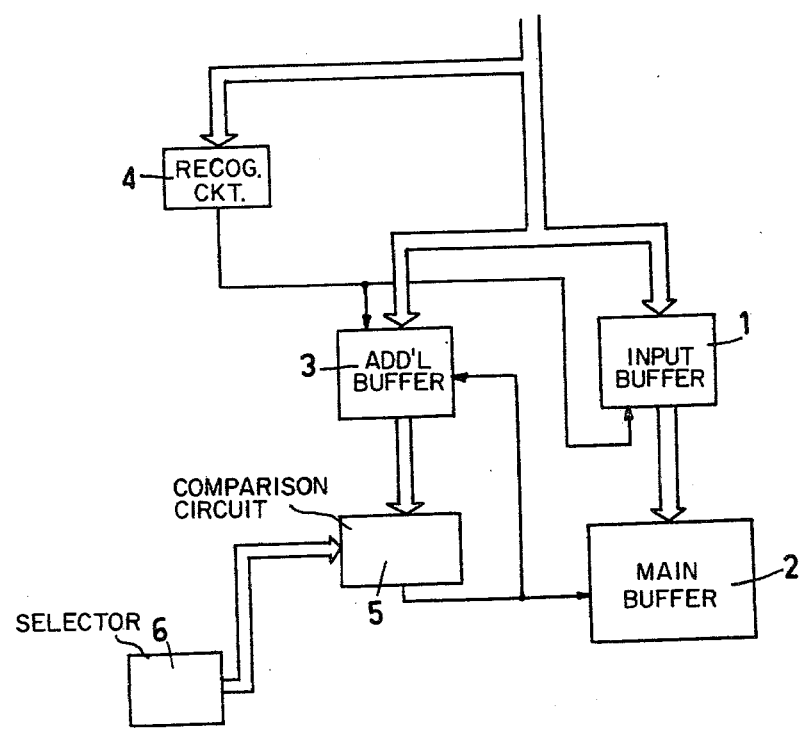

PAGE SELECTION DEVICE FOR VIDEOTEXT SYSTEM

The present invention relates to a page selection device for videotext system compatible with the broadcasting of videotext data in a full television channel ("full channel").

A videotext system allowing display of data on the screen of a television set is disclosed in French patent application No. 2,363,949. In such a system, called ANTIOPE, a transmitting station broadcasts in form of blocks data originating from several channels. The blocks from the various channels are time multiplexed, the blocks from a given channel constituting together a magazine. A magazine is divided into several pages, the data of a page beginning with a particular code called page header, which is followed by the data indicative of the page number, and terminating with an end of page code.

The receiving end comprises an ordinary television set equipped with a decoder. Once the magazine is selected, the viewer indicates on a key-pad the number of the page which he wishes to read.

Once the page header is detected, the page number following the page header is compared with the selected number and if the comparison is positive, the character data are fed to a page memory and a character generator produces the display of a page of text on the screen of the television set from the data read out in the page memory.

It should be specified that each block consists of a data block composed of a variable number of bytes, at most 32 in the ANTIOPE system, and a prefix which precedes the data block and characterizes the block.

The prefix comprises in the ANTIOPE system eight bytes: the first two constitute a burst for synchronizing the time base of the receiver, the third is a byte synchronization word, the three following bytes (No. 4 to 6) allow detection of the blocks transmitted in a given channel and constitute what is called the magazine number. The seventh byte indicates the number of the successive blocks transmitted in the same channel and thus allows the loss of a block to be detected. It is called for this reason continuity index. Finally the eighth byte, called format, defines the number of useful bytes in the data block.

Furthermore, the data of a page represent several blocks, but the page header may be located in any position within a block.

When it is contemplated to broadcast videotex data in a full television channel, a problem resides in the processing time required for selecting a page. Namely, such a broadcasting mode implies a very high digit rate, for instance about 4 Mbits/sec, and the page selection processing including the comparison between the transmitted page number and the selected number cannot be achieved in a time compatible with such a rate.

Hence, if the incoming data are written as they are supplied in a buffer from which the data are read out for effecting the above comparison, the time taken for the comparison will be much longer than the time taken for entering data in the buffer. At the arrival of the following data, the content of the buffer will not have been transferred so that the data will not be entered and will be suppressed.

The aim of the invention is to overcome such problem by enabling very rapid decision-making as to the transfer of data for display purposes.

There is provided according to the invention an input buffer having a capacity of at least one block, in which data are entered as they appear, an additional buffer with a capacity of at least one block, in which the incoming data are only entered if a page header has been detected, a main buffer with a capacity of at least one page, in which the content of the input buffer is transferred when a page header is detected, and means for comparing the page number entered in the additional buffer with the selected number and for controlling, according to whether the comparison is positive or not, either reading of the data entered in the main buffer for transfer to said memory or resetting to zero the additional and main buffers.

As the page number is read out in the additional buffer, the comparison with the selected number can be effected very rapidly and hence the decision to utilize or in contrary to erase the data entered in the main buffer can be made very quickly. Thus, if a non interesting page is entered in the main buffer, it will be quickly erased and will not interfere with entering the following page.

The provision of the input buffer allows data belonging to the prefix such as continuity index and format and thus supplied before the data block to be transferred towards the main buffer.

The invention will be described in detail hereinafter with reference to the accompanying drawing which shows in block form the device according to the invention.

The incoming data are arranged in blocks comprising each a data group of at most 32 bytes following a prefix of 8 bytes. All the blocks constitute a so-called magazine divided into pages, each page including several blocks, and each page begins with a page header followed by the page number and terminates with an end of page code.

The first three bytes of the prefix are intended for bit and byte synchronization as disclosed in the above-cited French patent application No. 2,363,949. It is thus superfluous to describe here the processing of these bytes.

The following three bytes of the prefix define the magazine number and allow the viewer to select the digital channel in which he is interested from among all the time multiplexed channels.

The last two bytes of the prefix which define the continuity index and the format as explained above must in contrast be transferred with the data groups.

The incoming data represent all the pages of the selected magazine, but only the data corresponding to the page selected by the viewer must be transferred to a page memory, not shown, for the purpose of display on the television screen.

The device according to the invention comprises an input buffer 1 with a capacity of at least one block, in fact 64 bytes. The input buffer 1 is a FIFO (first in, first out) memory in which is entered a data block comprising as already explained the continuity index, the format and the data group.

The blocks entered in the input buffer 1 are transferred in a manner explained below to a main buffer 2 constituted by a FIFO memory with a capacity of at least one page, in fact 2048 bytes.

The data are also fed to an additional buffer 3 constituted by a 64-byte FIFO memory, but writing in the additional buffer 3 is controlled by detection of a page header in the recognition circuit 4.

If a block includes a page header, the circuit 4 controls transfer of the block entered in the input buffer 1 to the main buffer 2. Further, detection of the page header enables writing in the additional buffer 3 and hence the data written in the additional buffer 3 are the page header, the page number and the following data of the block. But the continuity index, the format and the data eventually preceding the page header are not written in the additional buffer 3.

The data entered in the additional buffer 3, namely essentially the page number, are compared in a comparison circuit 5 with the page number selected by the viewer by means of a selector 6 e.g. a key-pad. If the comparison is positive then the comparison circuit 5 triggers the transfer of the data written in the main buffer 2 for display purposes.

If the comparison is negative the data written in the main buffer are not interesting and the comparison circuit 5 immediately resets to zero the main buffer 2 as well as the additional buffer 3.

Since the interesting data in the additional buffer 3 namely the page header and the page number, have been written first, they are also available first and the access time pertaining to said data, hence the processing time, are reduced to a minimum. This allows the main buffer 2 to be reset to zero before occurrence of the following page header.

A page comprises at least 5 blocks corresponding each to a picture scanning line, namely 64 microsec. The time taken for the transmission of a page is therefore at least $5 \times 64 = 320$ microsec.

The above-described processing beginning with a page header takes at most 300 microsec. The resetting of the main buffer 2 will thus take place before appearance of the following page header, and the main buffer will be available for storing the data of the following page.

What we claim is:

1. A page selection device for a videotext system in which the incoming data are arranged in blocks comprising a data group following a prefix, some of the blocks having within said group specific codes called page headers, a page comprising the data between a page header and an end of page code, the page to be displayed being transferred to a page memory, said device comprising an input buffer having a capacity of at least one block, in which data are entered as they appear, an additional buffer with a capacity of at least one block, in which the incoming data are only entered if a page header has been detected, a main buffer with a capacity of at least one page, in which the content of the input buffer is transferred when a page header is detected, and means for comparing the page number entered in the additional buffer with the selected number and for controlling, according to whether the comparison is positive or not, either reading of the data entered in the main buffer for transfer to said memory or resetting to zero the additional and main buffers.

* * * * *